(12) United States Patent
Heller

(10) Patent No.: US 11,196,718 B2
(45) Date of Patent: Dec. 7, 2021

(54) METHOD OF SECURE DATA STORAGE AND TRANSFER

(71) Applicant: Patrick Scott Heller, Goshen, IN (US)

(72) Inventor: Patrick Scott Heller, Goshen, IN (US)

( * ) Notice: Subject to any disclaimer, the term of this patent is extended or adjusted under 35 U.S.C. 154(b) by 207 days.

(21) Appl. No.: 16/711,650

(22) Filed: Dec. 12, 2019

(65) Prior Publication Data

US 2021/0185019 A1     Jun. 17, 2021

(51) Int. Cl.
*H04L 29/06*     (2006.01)
*G06F 21/72*     (2013.01)

(52) U.S. Cl.
CPC .......... *H04L 63/0428* (2013.01); *G06F 21/72* (2013.01)

(58) Field of Classification Search
USPC ......................................................... 713/168
See application file for complete search history.

(56) References Cited

U.S. PATENT DOCUMENTS

| 10,650,157 | B2* | 5/2020 | Schultz | G06F 21/6218 |
| 10,726,142 | B2* | 7/2020 | Copeland | G06F 21/85 |
| 2020/0218809 | A1* | 7/2020 | Lam | G06F 21/554 |
| 2020/0310661 | A1* | 10/2020 | Benisty | G06F 3/0637 |

\* cited by examiner

*Primary Examiner* — Amare F Tabor
(74) *Attorney, Agent, or Firm* — Botkin & Hall, LLP

(57) ABSTRACT

A method of secure data transfer and storage using a removable storage device storing encrypted information. The method uses a host that stores and transfers encrypted sensitive information and a customer that desires the information to be securely stored. The customer chooses a unique encryption code to encrypt sensitive information and places the encrypted files on the removable storage device, then physically transfers the information to the host. The encrypted sensitive information travels physically between the host and customer outside of any computer network. The host has a gapped area that remains disconnected from any network. The host takes the sensitive information and copies it to the designated armored storage unit.

13 Claims, 3 Drawing Sheets

METHOD OF SECURE DATA STORAGE AND TRANSFER

BACKGROUND OF THE INVENTION

This present disclosure relates to information stored on computer disks, USB devices, and removable storage. There are multiple ways data can be destroyed, compromised, or damaged. Data can be destroyed through hardware failure, such as a hard drive crash or power surge, or through fire, flood, or mechanical force. Data stored on networked computers can also be compromised through hacking over the internet. It can also be compromised by careless behavior such as leaving a computer logged in and unattended, leaving an unsecured laptop out where it can get stolen, or losing a USB flash drive with sensitive information stored on it. Some systems and methods attempt to solve these problems, but often fall short. There are encryption algorithms to prevent a loose flash drive from being read, antivirus software to reduce the chances of a cyberattack, and enclosures to prevent destruction from fire, flood, or mechanical damage. Each system has individual vulnerabilities. An improved method is needed.

SUMMARY OF THE INVENTION

The present disclosure describes a method of using an air-gapped computer system in concert with ruggedized encrypted on-site storage and portable encrypted storage. The method involves transfer of information from a customer's location to the secure location without the information touching any outside network or the internet. The files are encrypted at the customer's location and sent on a ruggedized flash drive. The customer with the ruggedized flash drive and encryption key is the only one who can access the information. A mobile application is used to request the ruggedized flash drive and track its status. File transfer occurs between the on-site storage and removable storage only on the air-gapped computer system. The on-site storage retains previous versions of information.

BRIEF DESCRIPTION OF THE DRAWINGS

A preferred embodiment of this invention has been chosen wherein.

DESCRIPTION OF THE PREFERRED EMBODIMENT

Figure 1:
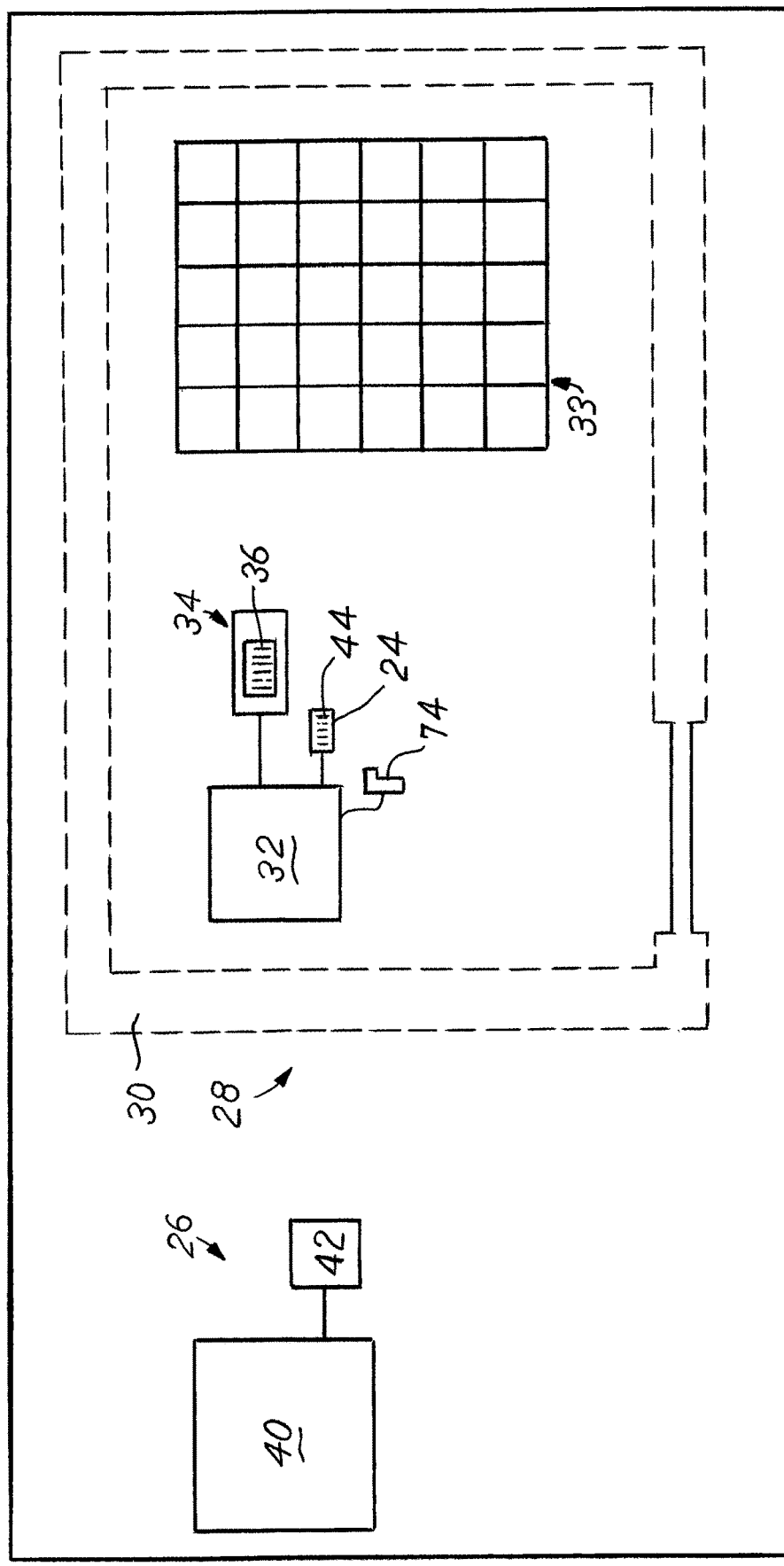
FIG. 1 is a diagram of the system at the host.
Figure 2:
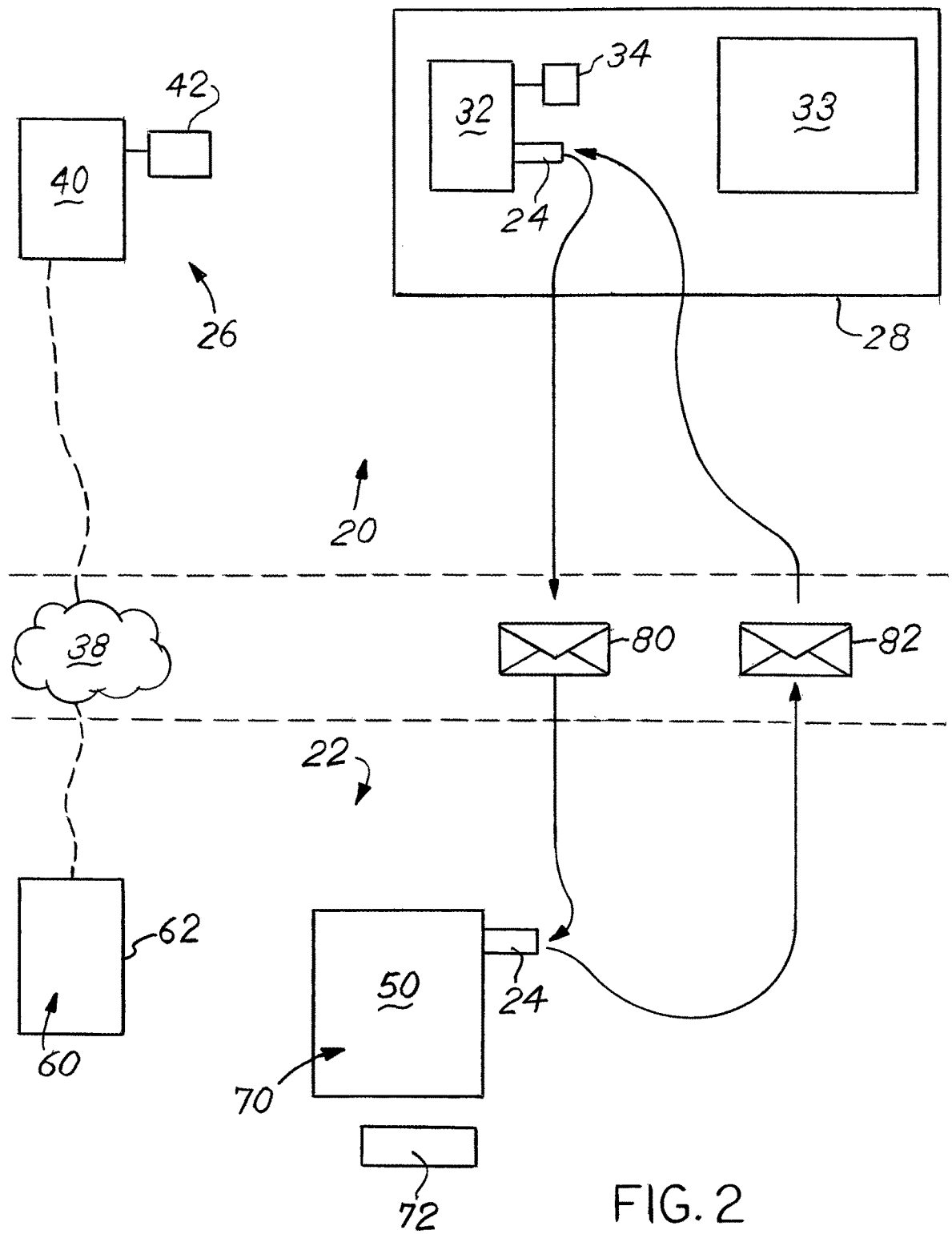
FIG. 2 is an overall diagram of the systems at the host, customer, and the flow of information between them.
Figure 3:
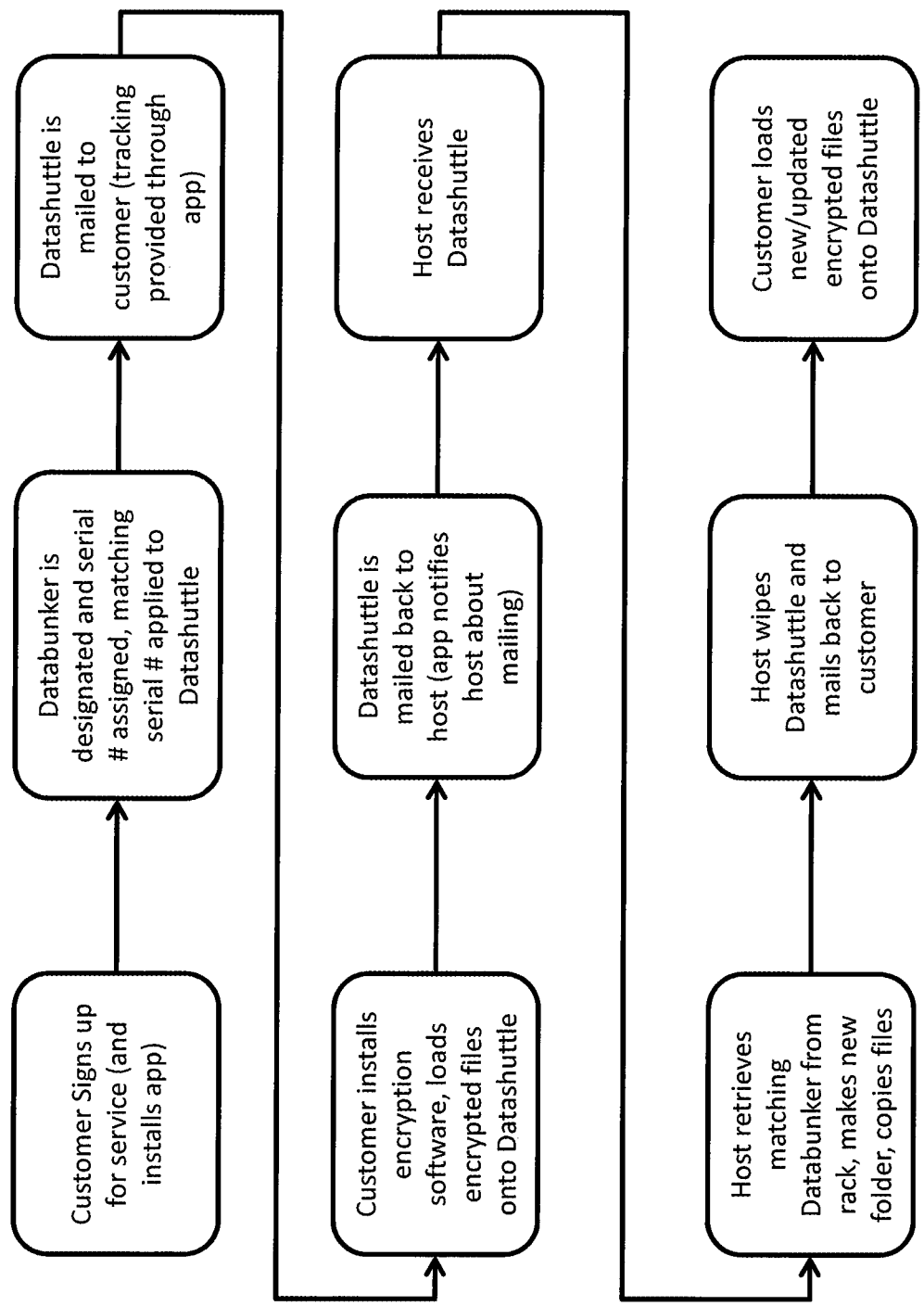
FIG. 3 is a flow diagram for when the customer sends sensitive information to the host.

An apparatus and method of securely storing and updating information is described herein, involving a host 20, a customer 22, and the physical transportation of a removable device 24. The removable device 24 is made to withstand rough handling and may incorporate ruggedizing materials and manufacturing. For example, the removable device 24 may be integrated into a durable and/or resilient enclosure. The enclosure may include padding, other mechanical shock protection, and/or protection from moisture. The host 20 is the secured location where sensitive information is stored and archived. The customer 22 is located separately from the host 20 and has data that the customer desires to be securely backed up. Sensitive information is transferred between the host 20 and customer 22 completely offline, meaning the mail, hand-delivery, courier, or other method that is completely separate from any computer network. All file transfer and storage outside of the customer is encrypted and inaccessible without a customer-chosen unique encryption key 72. Any intercept of the removable device 24 by an unauthorized user will result in unreadable and inaccessible information without the encryption key 72.

The host 20 is a secure location and has a connected area 26 and an air-gapped area 28. While they are shown adjacent, the connected and air-gapped areas 26, 28 may be separate buildings, locations, or rooms. The connected area 26 is connected to the internet 38 but may have restricted access. The restricted access may include physically restricting access and/or restricting computer and network access. The air-gapped area 28 is completely separate from any outside communications and is surrounded by an "air-gap" 30, meaning there is no internet, intranet, or other network connectivity to any devices contained inside the area 28. The air-gapped area 28 is protected from outside unauthorized access at the host 20. The protection may be in the form of lock and key, key cards, physical keys, access codes, RFID tags, or other systems to restrict physical access to the air-gapped area 28. Located inside the air-gapped area 28 is an array 33 of armored storage units 34, each having their own barcoded serial number 36 or other unique identification. The armored storage units 34 described herein are metal enclosures with extreme heat-resistant insulation and components, but it is contemplated that other types of storage devices are used, such as removable hard drives or other storage media. It is contemplated that the armored storage units 34 are stored in fire resistant enclosures. The air-gapped area 28 may be supplied by an independent power source, backup generator, or otherwise be connected to an off-grid supply of power. The air-gapped area 28 further contains a gapped host computer 32 that may be located adjacent the array 33 or in a separate location. The gapped host computer 32 is completely standalone from any computer network, including any computer network at the host. Further, the gapped host computer 32 may contain a custom operating system, software, or firmware that is used for copying and updating sensitive information between the storage unit 34 and removable storage device 24. The storage units 34 are normally in a disconnected state and reside in the storage array 33, where no electricity is present and no communication to the storage unit 34 can occur. The storage units 34 are rugged and are protected from high heat, mechanical damage, liquid intrusion, and electrical events. Each storage unit 34 has a rigid metal shell with a tight-fitting lid. Inside the metal shell is high-temperature insulation that surrounds a storage unit. The storage unit may include phase-change heat absorbers that surround a solid-state storage device. Sacrificial wiring connects the solid-state storage device through a small gap in the rigid metal shell. In the event that there is a fire, flood, earthquake, collapse, or other damaging event inside the air-gapped area 28, each storage unit 34 is individually protected. This is in contrast to a server or drive array that relies on protection supplied by the room or area where it is installed. In a server or drive array, a flood or fire could easily cause destruction of all data and hardware.

The connected area 26 has an internet-connected host computer 40. For simplicity, the internet-connected host computer 40 is shown and described as a single computer, but the internet-connected host computer 40 can be a network or series of computers that may be completely located at the host or hosted off-site. There is no communication between the internet-connected host computer 40 and the gapped host computer 32. The internet-connected host computer 40 has a barcode printer 42, which is located at the host 20. The connected host computer 40 may have a database that stores customer information, such as the mailing address, billing information, file transfer log, serial number/ID of their storage unit 34.

The customer has its own computer 50 or computer network that uses sensitive information. The sensitive information may be stored on a network drive, attached storage, or on the computer(s) directly. The customer's computer 50 may be connected to the internet 38 or also be air-gapped. Sensitive information can include trade secrets, banking information, programs, personnel records, accounts and passwords, databases, or any type of electronic files or information that may be important to the customer. The term "sensitive information" is used as a definition for the files that are stored and transferred between the host and customer and is not limiting to the types of files that are stored, encrypted, and transferred. While the files are commonly sensitive or contain sensitive information, the files can also be ordinary and/or publicly-available.

An app 60 may be provided by the host that the customer installs on a device 62 that is connected to the internet 38. This is commonly a smartphone, tablet, or other mobile device. The app 60 communicates with the connected host computer 40 through the internet 38 and is used to initiate the offline transfer of sensitive information. The app 60 also is used to track any shipment/delivery of the removable storage device 24. Alternatively, the customer 22 may contact the host computer 40 through the internet via web portal, phone call, or email. The customer installs encryption software 70 and chooses a unique encryption key 72 that is not shared with anyone at the host 20. Without the encryption software 70 and key 72, the sensitive information is completely inaccessible, even by the host 20. If the customer 22 loses the encryption key 72, the data is inaccessible.

The gapped host computer 32 may include a barcode reader 74 to document and ensure that the barcodes 36, 44 match before any file transfer. Because the files are not readable by the host, ensuring matching serial numbers prevents errors and loss of information.

There are different scenarios when transferring sensitive information. These include, but are not limited to, the following: initial load, updating, and restoration. In the initial load, the sensitive information is only at the customer's computer 50 and no sensitive information is present at the host 20. When updating, the sensitive information at the customer's computer 50 has been updated or changed, and the customer desires the updated sensitive information to be stored at the host. During restoration, the sensitive information has been compromised or destroyed and the sensitive information stored at the host 20 is the only trusted copy. Alternatively, the customer 22 desires to move it to a new computer or network. In all scenarios, the sensitive information never travels between the host and customer via a computer network or the internet. The files are only transferred by physical delivery.

For the initial load, the customer 22 contacts the host for a blank removable device 24. The connected host computer 40 prints out a unique barcode 44 that is tied to that customer and a designated storage unit 34. The unique barcode 44 matches on the removable device 24 and storage unit 34. The barcode 44 is applied to the blank removable device 24 and then the host 20 places the blank device 24 in the mail 80 to the customer. The mail 80 is tracked by the host 20 to ensure safe delivery to the customer 22. The customer 22 installs encryption software 70 and chooses an encryption key 72. If the encryption key 72 is lost, any encrypted information is inaccessible. Upon receipt of the removable device 24, the customer 22 connects the blank removable device 24 to the customer computer 50 and enters the encryption key 72. The customer 22 encrypts and loads all sensitive information onto the removable device 24. This takes the sensitive information and transforms it to encrypted sensitive information as it is being loaded onto the removable device 24. Upon completion, the customer 22 then mails 82 the removable device 24 to the host 20. The host 20 tracks the package, either through the app 60 or being otherwise notified by the customer 22. The sensitive information on the removable device 24 is encrypted. When the removable device 24 arrives at the host 20, the barcode is scanned at the connected host computer 40 to tie it to the customer's account. The removable device 24 is never connected to the connected host computer 40, only the gapped host computer 32. The host 20 identifies the correct armored storage unit 34 in the gapped area 28. The armored storage unit 34 and removable device 24 are connected to the gapped computer 32 and the encrypted files are copied from the removable device 24 to the armored storage unit 34. After file transfer is complete, the armored storage unit 34 is disconnected and placed back in the array 33. The host cannot access files on either device 24, 34 due to the encryption. The removable device 24 is then wiped clean of information and mailed back to the customer. The customer 22 may be notified through the app that the transfer is complete and the blank removable device 24 is on its way back to them.

To update the sensitive information, the customer 22 takes the removable device 24 and loads encrypted sensitive information onto the removable device 24. The customer then notifies the host 20 through the app 60 and mails 82 the removable device to the host 20. When the host 20 receives the removable device 24, the encrypted files are copied from the removable device 24 to the armored storage unit 34. A new folder is added to the armored storage unit 34 with the updated information. Each time the sensitive information is updated, a new folder is created to allow previous versions of sensitive information be retrievable by the customer in the event one version of the sensitive information is corrupted or otherwise compromised. It is contemplated that alternate methods of saving and retrieving versions of sensitive information are used.

To restore sensitive information, the customer 22 contacts the host 20 through the app 60. The host may either load a new removable device 24 with sensitive information or mail 80 the armored storage unit 34 back to the customer 22. As with other mailing or shipping, the progress is tracked through the app 60.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:
1. A method of secure data transfer and storage between a host and a customer, said method comprising:
   said host providing a gapped host computer in a secure location, said gapped host
      computer isolated from a network;

said host providing a storage unit in said secure location;
said host providing a removable storage device connectable to said gapped host computer
and said removable storage device connectable to a customer computer;
said host providing a connected host computer connected to said network;
said host serializing said storage unit and said removable storage device;
said host sending said removable storage device to said customer;
said customer encrypting and transferring sensitive information from said customer
computer to said removable storage device so that said removable storage device
contains encrypted sensitive information;
said customer sending said removable storage device with said encrypted sensitive
information to said host; and
said host transferring said encrypted sensitive information to said storage unit using said
gapped host computer.

2. The method of claim 1, wherein said sending of said removable storage device between said customer and said host is tracked by said host.

3. The method of claim 1, wherein said removable storage device is protected from damage during said sending.

4. The method of claim 1, wherein said storage unit is protected from damage at said host.

5. The method of claim 1, further comprising wiping said removable storage device after transferring said encrypted sensitive information to said storage unit.

6. The method of claim 1, further comprising said removable storage device and said storage unit having matching unique identifying information.

7. The method of claim 1, said customer communicating with said connected host computer to initiate said host sending said removable storage device to said customer.

8. The method of claim 1, further providing tracking said physical transfer between said host and said customer computer.

9. The method of claim 8, further providing an application for requesting tracking information from said host.

10. A method of secure data transfer and storage for sensitive information comprising the steps of:
providing a gapped area at a host having restricted access and comprising;
a gapped host computer isolated from any computer network; and
an array of storage units for storing said sensitive information, each said storage unit
having a unique identification;
providing a connected area at said host comprising;
a connected host computer connected to a computer network; and
a database storing customer information and said unique identification for a
corresponding said storage unit;
providing a customer computer, said computer having said sensitive information;
providing a removable storage device having a matching said unique identification
corresponding to said customer information, said removable storage device
connectable to said gapped host computer and said customer computer;
physically transferring said removable storage device from said gapped area to said
customer computer;
generating an encryption key and encrypting and transferring said sensitive information
from said customer computer to said removable storage device;
physically transferring said removable storage device with said encrypted sensitive
information to said gapped area at said host; and
copying said encrypted sensitive information on said gapped host computer in said
gapped area to a matching said storage unit.

11. The method of claim 10, further providing tracking said physical transfer between said host and said customer computer.

12. The method of claim 10, further providing an application for requesting tracking information from said host.

13. The method of claim 10, further comprising serializing said removable storage device and said storage units.

* * * * *